(12) United States Patent
Vaittinen et al.

(10) Patent No.: US 7,623,885 B2
(45) Date of Patent: Nov. 24, 2009

(54) SYSTEM, APPARATUS, COMPUTER PROGRAM PRODUCT AND METHOD FOR CONTROLLING TERMINAL OUTPUT POWER

(75) Inventors: Rami Vaittinen, Littoinen (FI); Harri Jokinen, Pertteli (FI)

(73) Assignee: Nokia Corporation, Espoo (FI)

( * ) Notice: Subject to any disclaimer, the term of this patent is extended or adjusted under 35 U.S.C. 154(b) by 471 days.

(21) Appl. No.: 10/946,905

(22) Filed: Sep. 22, 2004

(65) Prior Publication Data

US 2005/0261017 A1 Nov. 24, 2005

Related U.S. Application Data

(60) Provisional application No. 60/573,971, filed on May 24, 2004.

(51) Int. Cl.
*H04B 7/00* (2006.01)
(52) U.S. Cl. .............. 455/522; 455/127.4; 455/436; 455/437; 455/438; 455/439; 455/69; 455/553.1; 455/552.1; 455/560; 370/331; 370/332; 370/353; 370/354; 370/328
(58) Field of Classification Search .............. 455/127.4, 455/522, 436, 437, 438, 439, 69, 553.1, 552.1, 455/560; 370/331, 332, 353, 354, 328
See application file for complete search history.

(56) References Cited

U.S. PATENT DOCUMENTS

| | | |
|---|---|---|
| 5,220,678 A | 6/1993 | Feei |
| 5,634,195 A | 5/1997 | Sawyer |
| 5,995,496 A | 11/1999 | Honkasalo et al. |
| 6,477,388 B1 | 11/2002 | Schmutz |
| 6,512,784 B2 * | 1/2003 | Schilling .................. 375/141 |
| 6,647,005 B1 * | 11/2003 | Cao et al. ................... 370/342 |
| 7,050,824 B2 * | 5/2006 | Masseroni et al. .......... 455/522 |
| 7,069,035 B2 * | 6/2006 | Chen et al. ................. 455/522 |
| 7,142,548 B2 * | 11/2006 | Fong et al. ............... 370/395.4 |
| 7,167,713 B2 | 1/2007 | Anderson |
| 7,215,958 B2 * | 5/2007 | Kovacs et al. .............. 455/436 |

(Continued)

FOREIGN PATENT DOCUMENTS

EP 0515335 5/1992

(Continued)

OTHER PUBLICATIONS

Mark Pecen and Andrew Howell, "Simultaneous Voice and Data Operation for GPRS/Edge: Class A Dual Transfer Mode", Apr. 2001, IEEE Digital Object Identifier, vol. 8, issue 2, 14-29.*

(Continued)

*Primary Examiner*—Lana N Le
*Assistant Examiner*—Ping Y Hsieh
(74) *Attorney, Agent, or Firm*—Hollingsworth & Funk, LLC

(57) ABSTRACT

Controlling the output power level of a dual transfer mode (DTM) capable terminal involves generating a network message. The network message may be a circuit-switched (CS) handover command and/or a point-to-point signaling message. A maximum output power level value is associated with the network message. The network message is transferred from the network to the terminal. A packet-switched (PS) output power level of the terminal is determined using the maximum output power level value received via the network message.

31 Claims, 6 Drawing Sheets

U.S. PATENT DOCUMENTS

| | | | |
|---|---|---|---|
| 7,236,792 B2 * | 6/2007 | Uchida et al. ............ | 455/452.1 |
| 7,286,499 B2 | 10/2007 | Tiedemann, Jr. | |
| 7,532,601 B2 | 5/2009 | Kayama et al. | |
| 2003/0078037 A1 | 4/2003 | Auckland et al. | |
| 2003/0123425 A1 | 7/2003 | Walton et al. | |
| 2004/0077348 A1 * | 4/2004 | Sebire et al. ................ | 455/436 |
| 2005/0255872 A1 * | 11/2005 | Lundell et al. .............. | 455/522 |

FOREIGN PATENT DOCUMENTS

| | | |
|---|---|---|
| EP | 1211817 | 5/2002 |
| WO | WO 01/63851 A1 * | 8/2001 |
| WO | WO/2001/163851 | 8/2001 |

OTHER PUBLICATIONS

Pecen et al., "Simultaneous Voice and Data Operation for GPRS/Edge: Class A Dual Transfer Mode", IEEE Personal Communications, Apr. 2001, pp. 14-29.

3$^{rd}$ Generation Partnership Project, "Radio Access Network; Radio subsystem link control", 3GPP TS 45.008 V6.6.0, Release 6, Feb. 2004.

3$^{rd}$ Generation Partnership Project, "Mobile Station (MS)—Base Station System (BSS) interface; Radio Link Control/Medium Access Control (RLC/MAC) protocol", 3GPP TS 44.060 V6.6.0, Release 6, Feb. 2004.

3$^{rd}$ Generation Partnership Project, "Mobile radio Interface layer 3 specification; Radio Resource Control (RRC) protocol", 3GPP TS 44.018 V6.6.0, Release 6, Feb. 2004.

3$^{rd}$ Generation Partnership Project, "Radio Access Network; Dual Transfer Mode; Stage 2", 3GPP TS 43.055 V6.4.0, Release 6, Feb. 2004.

3$^{rd}$ Generation Partnership Project, "General Packet Radio Service (GPRS); Service description; Stage 2", 3GPP TS 23.060 V6.6.0, Release 6, Mar. 2004.

European Telecommunication Standard, "Digital cellular telecommunications system (Phase 2+); Radio subsystem link control", GSM 05.08 version 5.7.0, May 1998.

3$^{rd}$ Generation Partnership Project, "General Packet Radio Service (GPRS); Mobile Station (MS)- Base Station System (BSS) Interface; Radio Link Control/Medium Access Control (RLC/MAC Protocol", 3GPP TS 44.060 V6.6.0, Feb. 2004.

2007, Office action from U.S. Appl. No. 10/836,128 mail date Jul. 25, 2007.

2008, Office action from U.S. Appl. No. 10/836,128 mail date Nov. 7, 2008.

2009, Office action from U.S. Appl. No. 10/836,128 mail date May 26, 2009.

* cited by examiner

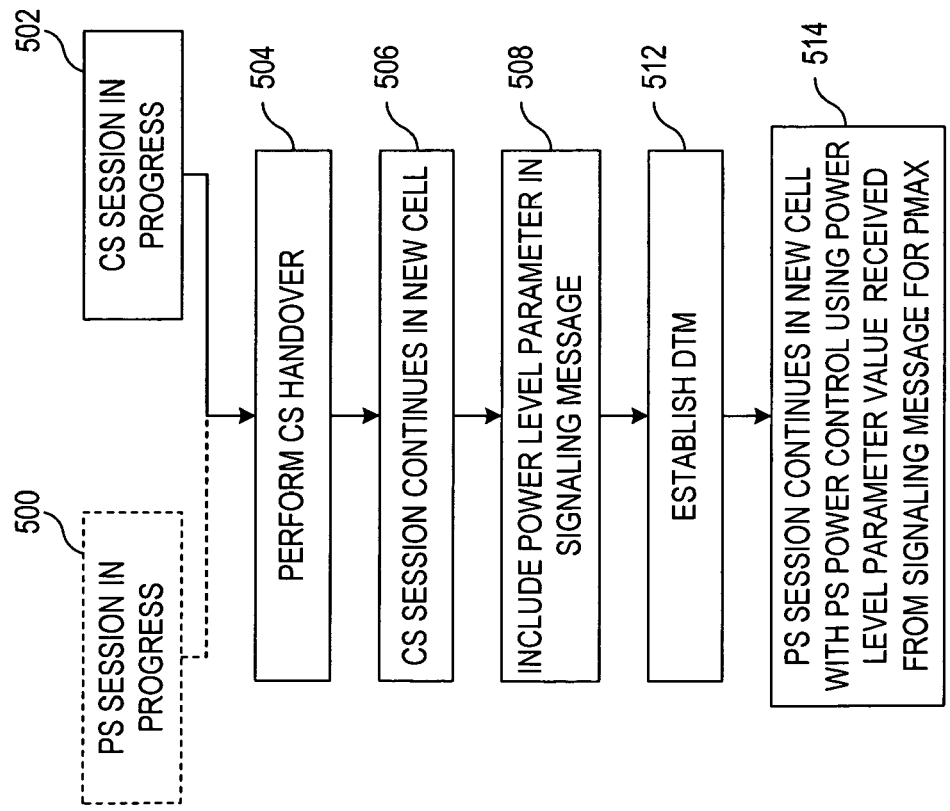
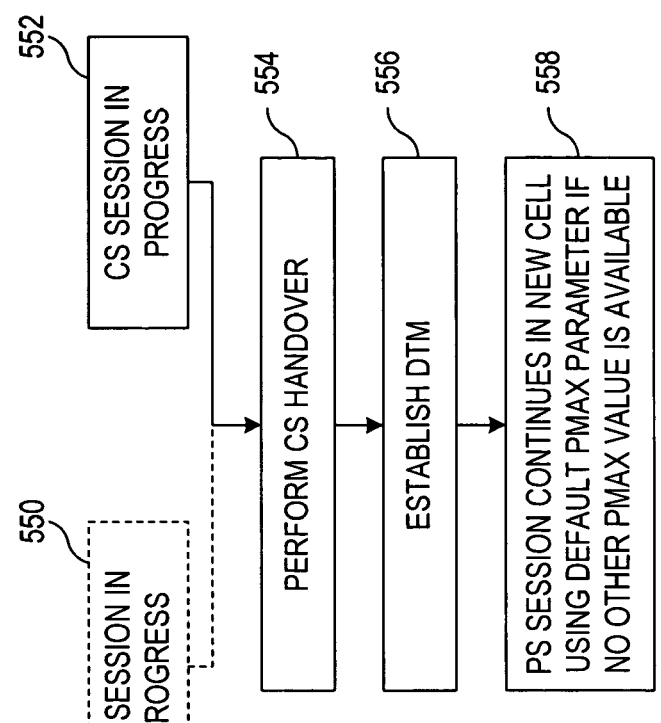
FIG. 5B
FIG. 5A

SYSTEM, APPARATUS, COMPUTER PROGRAM PRODUCT AND METHOD FOR CONTROLLING TERMINAL OUTPUT POWER

This application claims the benefit of U.S. Provisional Application No. 60/573,971, filed 24 May 2004, the content of which is incorporated herein by reference in its entirety.

FIELD OF THE INVENTION

This invention relates in general to wireless communications, and more particularly to a system, apparatus, computer program product, and method for controlling terminal output power levels.

BACKGROUND OF THE INVENTION

In wireless network environments such as cellular networks, network entities are provided to facilitate the communication between communicating devices on the network. In Global System for Mobile communications (GSM) networks, Base Station Systems (BSS) are provided on the network, which include one or more Base Transceiver Stations (BTS) and a Base Station Controller (BSC). The BTS manages the radio interface to Mobile Stations (MS) and/or other terminals, and includes the transceivers and antennas to service each cell. A group of BTSs are controlled by a BSC, which provides the control functions and physical links between the Mobile Switching Center (MSC) and the BTS.

The interface between the network and a mobile terminal is often referred to as the radio interface. Radio Resource management (RR) and/or MSC procedures are used to establish, maintain, and release connections that allow a point-to-point dialogue between the network and the terminal. These procedures include "handover" procedures, which generally refers to the passing of a call in progress from one channel or cell to another. An RR element such as the BSC performs high-capacity switching functions, including handover, as well as control of radio frequency (RF) power levels in BTSs.

The first GSM and other analogous networks were designed for voice services. When the user of the GSM data services began, it became evident that the circuit-switched (CS) bearer services were not particularly well suited for certain types of applications, such as those involving date transmissions exhibiting a "bursty" nature. Therefore, in the GSM context, the new packet-switched (PS) data transmission service, General Packet Radio Service (GPRS), was defined for packet services. Generally, GPRS is a packet radio network utilizing the GSM network, which endeavors to optimize data packet transmission by means of GPRS protocol layers on the air interface between a mobile station (or other terminal) and a GPRS network.

If there is no active connection between a terminal and a BSS, the terminal is at rest or in "idle" mode, and the BSS has no specific tasks to perform relative to the terminal. However, the terminal continues to monitor control channels such as the Broadcast Control Channel (BCCH) or the Packet Broadcast Control Channel (PBCCH) of the current and neighboring cells, to facilitate location update operations. In dedicated mode, a physical point-to-point bidirectional RR connection is established. Thus, in dedicated mode, the terminal is allocated dedicated channels for communicating information.

A GPRS mobile station (MS) or other GPRS terminal can operate in one of three modes of operation. A "Class A" mode of operation refers to a mode where the terminal is attached to both GPRS and other GSM services. The mobile user can initiate and/or receive calls on the two services simultaneously. For example, the mobile user can participate in a GSM voice call while simultaneously receiving GPRS data packets. A "Class B" mode of operation refers to a mode where the terminal is attached to both GPRS and other GSM services, but the terminal can only operate one set of services at a time. Another mode of operation, "Class C," refers to a mode where the terminal can only be attached to either the GSM network or the GPRS network. The selection is performed manually, and there are no simultaneous operations.

Terminals operating in the Class A mode of operation therefore can be attached to both CS and PS services, and can be actively engaged in both services simultaneously. An example of such a Class A mode of operation is the Dual Transfer Mode (DTM) used in GSM/GPRS systems. Other network environments may include analogous modes of operation, such as the Multi Radio Access Bearer (Multi RAB) mode in Wideband Code Division Multiple Access (WCDMA) systems. For example, DTM is applicable for terminals that support GPRS/EGPRS or future analogous systems. A terminal in DTM has resources for an RR connection and is simultaneously allocated resources for one or more temporary block flows (TBFs), provided that the BSS coordinates its allocation of radio resources.

It is noted that during a connection, i.e. when the terminal is in transfer mode such as the "dedicated mode," power control functions serve to maintain and optimize the radio channel. It is very important that terminals that send data to the network use the proper output power level. If the output power level of the terminal is too low, data throughput may suffer due to errors caused by sub-optimal radio conditions. If the output power level of the terminal is too high, excessive power consumption results, and the data transmission may cause interference to other channels used by other terminals.

In GPRS data transmissions, the terminal determines the appropriate output power levels using specified formulas. These formulas include parameters that the terminal obtains from various sources, namely from system information messages broadcast by the network, or from control messages that are sent specifically to each of the terminals. Such system information messages are transmitted by the network in two possible logical channel structures, depending on the base selected by the network operator. If packet channel structure exists, the system information messages are transmitted on the PBCCH; otherwise the system information messages are transmitted on the BCCH.

As indicated above, the terminal's maximum output power is based on parameters received in system information messages via PBCCH/BCCH while in the (packet) idle mode. When the terminal moves via the dedicated mode to the dual transfer mode the maximum output power may be correct. However when the terminal is in dual transfer mode and it is handed over to a new cell, the terminal is lacking the correct output power parameters of the new cell. The same problem exists if the terminal is in the dedicated mode and it is handed over one or several times to a new cell in which the terminal requests PS resources. The terminal cannot calculate correct output power level for packet switched resources in the new cell while staying in the dedicated mode. Therefore the terminal is not aware of the correct output power and specifically the correct maximum output power for packet transfer when it enters to the dual transfer mode in the target cell.

Accordingly, there is a need in the communications industry for a manner of properly establishing the terminal output power levels in changing circumstances, such as where a terminal is operating in dual transfer mode and a handover occurs. A further need exists for a system and methodology that provides an unintrusive and efficient manner for providing such information, while working within existing protocols and structures. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system, apparatus, computer program product and method for controlling terminal output power levels.

The invention facilitates reaching a known and/or consistent PS output power control for DTM in all cases, including DTM after a CS handover. The PS power control formula includes the PMAX parameter, which defines the maximum power allowed for PS channels. Because this parameter is currently not available in all cases, one embodiment of the invention involves providing the PMAX parameter value for the MS or other terminal through the CS handover command message from which the Power Level parameter value is used for PMAX, when PMAX is not otherwise available. In another embodiment of the invention, the PMAX parameter is added to system information messages, mainly system information 6 and DTM information message. This allows the MS to be aware of the PMAX parameter value always before requesting DTM. Yet another exemplary embodiment of the invention involves defining a default value for the PMAX parameter. This default value can be used whenever the PMAX value is not otherwise provided.

In one embodiment of the invention, a method for controlling the output power level of over-the-air (OTA) transmission signals from a terminal operable on a network involves providing a power level parameter to the terminal via a circuit-switched (CS) handover command. The power level parameter is utilized for packet-switched (PS) power control for PS traffic after CS handover.

In more particular embodiments, the method also involves defining a PS output power level to be used as the terminal's output power level for PS traffic after CS handover using the power level parameter received via the CS handover command. The PS output power level may be defined using a default value in defining the PS output power level if the power level parameter is not provided via the CS handover command.

In another more particular embodiment of the invention, the power level parameter includes a maximum power level parameter. Providing the maximum power level parameter to the terminal via the CS handover command may involve placing the maximum power level parameter in an existing power level information element of the CS handover command. The method may also involve defining a maximum packet-switched output power level (PMAX) and a PS output power level based on the maximum power level parameter received via the CS handover command. The PS output power level may be used as the terminal's output power level for PS traffic after CS handover. The PS output power level may be determined calculating the PS output power level according to the formula $P_{CH}=\min(\Gamma_0-\Gamma_{CH}-\alpha^*(C+48), PMAX)$. In one configuration, the terminal may simultaneously maintain a CS data session and a PS data session via the network.

In another embodiment of the present invention, a method for controlling the output power level of OTA transmission signals from a terminal operable in dual transfer mode (DTM) on a network involves generating at least one signaling message at the network. A power level parameter is associated with the signaling message. The signaling message is transmitted from the network to the terminal. A PS output power level is defined using the power level parameter received via the at least one signaling message. The PS output power is to be used as the terminal's output power level for PS traffic.

In more particular embodiments of the invention, the signaling message may determine whether or not DTM is supported in the new cell. The signaling message may also include a point-to-point system information message, a system information 6 (SI6) message, and/or a DTM information message. In one configuration, the PS output power may to be used as the terminal's output power level for PS traffic after a circuit-switched CS handover. Transmitting the signaling message may involve transmitting the at least one signaling message via a slow associated control channel (SACCH).

In another embodiment of the invention, a terminal is provided that is capable of communicating OTA via a CS network and a PS network. The terminal includes a transceiver capable of receiving a maximum power level parameter via at least one of a CS handover command and a point-to-point signaling message. A processor of the terminal is configured to utilize the power level parameter for PS power control for PS network traffic after a CS network handover.

In another embodiment of the invention, a processing arrangement is capable of communicating with a terminal via a CS network and a PS network. The arrangement includes a processor configured to determine a maximum power level parameter usable by the terminal for PS power control for PS network traffic after a CS network handover. The arrangement also includes a transceiver capable of sending the maximum power level parameter to the terminal via at least one of a CS handover command and a point-to-point signaling message.

In another embodiment of the invention, a computer-readable medium has instructions stored thereon. The instructions are executable by a computer system for controlling the output power level at a terminal by performing steps that involve receiving a maximum power level parameter via a network from at least one of a CS handover command and a signaling message. A PS output power level is determined based on the maximum power level parameter. A PS data session is established using the PS output power level after a CS handover.

In another embodiment of the invention, a system for controlling the output power level of OTA transmission signals from a terminal operable on a network includes 1) means for generating network message that includes at least one of a CS handover command and a signaling message; 2) means for associating a maximum output power level value with the network message; 3) means for transmitting the network message from the network to the terminal; and 4) means for defining a PS output power level of the terminal using the maximum output power level value received via the network message.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

FIGS. 4, 5A and 5B are flow diagrams illustrating alternative, representative embodiments for effecting PS power control for DTM after CS handover in accordance with the present invention.

DETAILED DESCRIPTION OF EMBODIMENTS OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention provides a system, apparatus, computer program product, and method for controlling terminal output power levels. The present invention is applicable in network environments that support simultaneous support of multiple services, such as the simultaneous support of circuit-switched (CS) voice and packet-switched (PS) data services. For example, in WCDMA systems this is generally referred to as Multi Radio Access Bearer (Multi RAB) services, and in GSM/GPRS systems it is generally referred to as Dual Transfer Mode (DTM). While the present invention is applicable in these and other analogous network environments, the present invention is described in terms of GSM/GPRS networks supporting DTM. GSM/GPRS networks are described generally below in order to provide a representative context in which embodiments of the present invention may be implemented. The invention is equally applicable for Enhanced GPRS (EGPRS), GSM/EDGE Radio Access Networks (GERAN), and other analogous network environments including CS and PS services.

Figure 1:
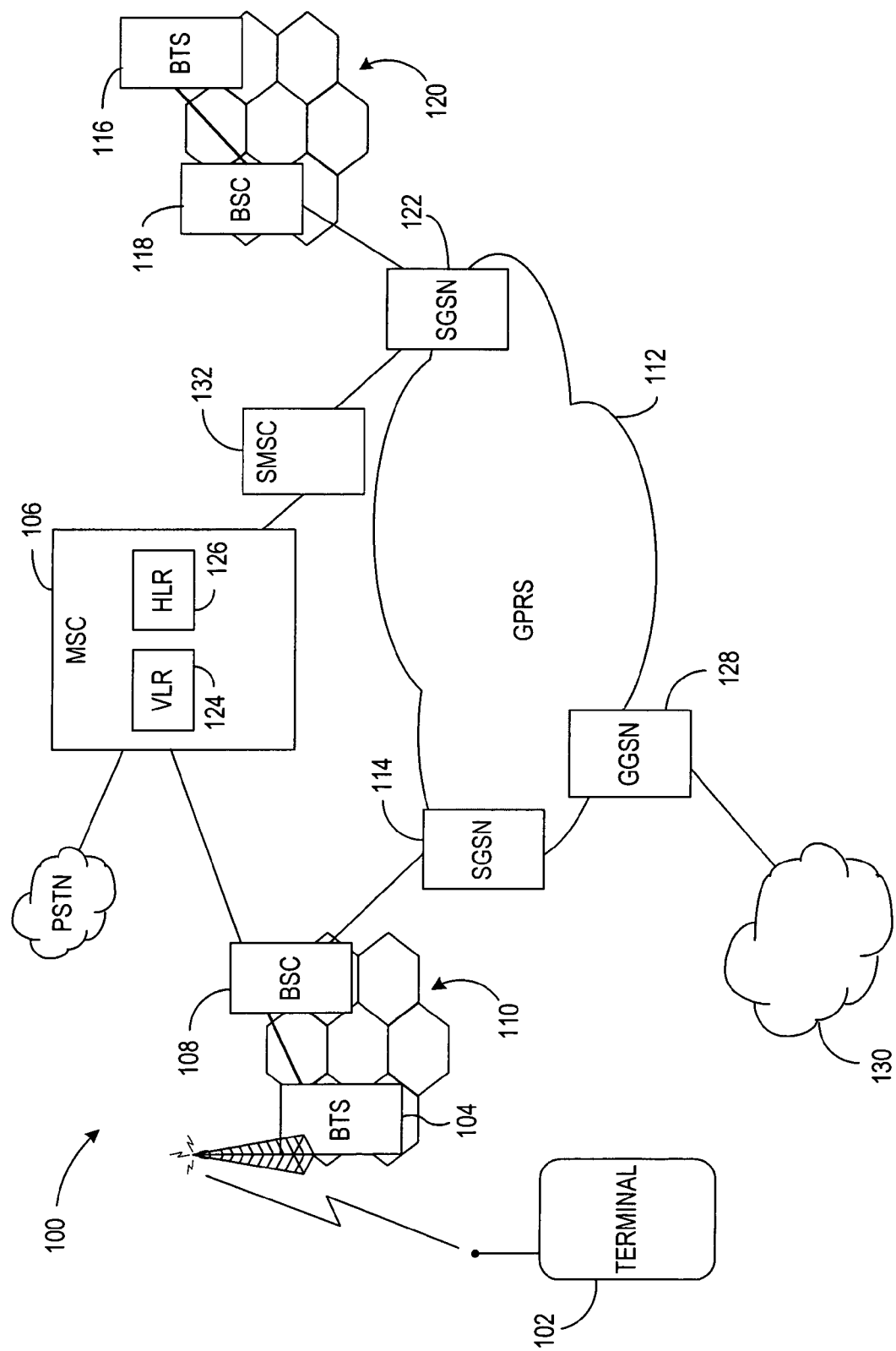
FIG. 1 illustrates a representative GSM/GPRS network environment in which the principles of the present invention may be utilized.

FIG. 1 illustrates some general aspects of a GSM/GPRS network environment 100 in which the principles of the present invention may be utilized. Global System for Mobile communications (GSM) is a digital cellular communications system serving as a Public Land Mobile Network (PLMN), where multiple providers may set up mobile networks following the GSM standard. GSM is capable of providing both voice and data services. A GSM (or analogous) network 100 typically includes components such as terminals or Mobile Stations (MS) 102, Base Transceiver Stations (BTS) 104, Mobile Switching Center (MSC) 106, etc. A GSM network may be viewed as a collection of various subsystems, including the Radio Subsystem (RSS) which covers radio aspects, Network and Switching Subsystem (NSS) which manages functions such as call forwarding, handover and switching, and the Operation Subsystem (OSS) that manages the network. Various aspects of the RSS are described in greater detail below.

One or more terminals 102 communicate with the BTS 104 via an air interface. The BTS 104 is a component of a wireless network access infrastructure that terminates the air interface over which subscriber traffic is communicated to and from the terminal 102. The Base Station Controller (BSC) 108 is a switching module that provides, among other things, handover functions, and controls power levels in each BTS 104 of the Base Station System (BSS) 110. The BSC 108 controls the interface between the MSC 106 and BTS 104 in a GSM mobile wireless network, and thus controls one or more BTSs in the call set-up functions, signaling, and in the use of radio channels.

A General Packet Radio System (GPRS) mobile communications network 112 is a packet-switched service for GSM that mirrors the Internet model and enables seamless transition towards 3G (third generation) networks. GPRS thus provides actual packet radio access for mobile GSM and time-division multiple access (TDMA) users, and is ideal for Wireless Application Protocol (WAP) services. The BSC 108 also controls the interface between the Serving GPRS Support Node (SGSN) 114 and the BTS 104 in a GPRS network 112. Other BTS, BSC, and SGSN components may also be associated with the network system, as depicted by BTS 116 and BSC 118 of BSS 120, and SGSN 122.

The MSC module 106 generally includes or is otherwise associated with the MSC, Visiting Location Register (VLR) 124, and Home Location Register (HLR) 126. The MSC 106 performs a variety of functions, including providing telephony switching services and controlling calls between telephone and data systems, switching voice traffic from the wireless network to the landline network if the call is a mobile-to-landline call, or alternatively switching to another MSC if the call is a mobile-to-mobile call. The MSC 106 also provides the mobility functions for the network, and serves as the hub for multiple BTSs. Generally, it is the MSC 106 that provides mobility management for subscribers, in order to register subscribers, and authenticate and authorize services and access for subscribers. In GSM systems, some of the functionality of the MSC 106 may be distributed to the BSC 108, while in other systems such as TDMA systems, the BSC 108 functions are often integrated with the MSC 106.

Associated with the MSC 106 is the HLR 126 and VLR 124. The HLR 126 is a database that stores information about subscribers in the mobile network, and is maintained by one or more service providers for their respective subscribers. The MSC 106 uses the information stored in the HLR 126 to authenticate and register the subscriber by storing permanent subscriber information including the service profile, the current location of terminals, and activity status of the mobile user. The VLR 124 is a database that may be maintained by the MSC 106 to keep track of all the visiting terminals within a mobile telephony system.

The Serving GPRS Support Nodes (SGSN) 114, 122 serve terminals that support GPRS by sending or receiving packets via a respective BSS 110, 120, and more particularly via the BSC 108, 118 in the context of GSM systems. The SGSN is responsible for the delivery of data packets to and from the terminals within its service area, and performs packet routing and transfer, mobility management, logical link management, authentication, charging functions, etc. In the exemplary GPRS embodiment shown in FIG. 1, the location register of the SGSN 114 stores location information such as the current cell and VLR associated with the terminal 102, as well as user profiles such as the International Mobile Subscriber Identity Number (IMSI) of all GPRS users registered with this SGSN. Another network element introduced in the GPRS context is the Gateway GPRS Support Node (GGSN) 128, which acts as a gateway between the GPRS network 112 and a packet switched public data network, such as data network 130. This gateway 128 allows mobile subscribers to access the public data network 130 or specified private IP networks. The connection between the GGSN 128 and the public data network is generally enabled through a standard protocol, such as the Internet Protocol (IP).

As previously indicated, the RSS includes components such as terminals, and the BSS which in turn generally includes a plurality of BTSs and a BSC. The BTS includes radio components such as a transceiver and antenna, while the BSC effects switching between BTSs, manages network resources, etc. The RSS supports a certain number of logical channels that fall within two primary categories including the traffic channels (TCH) and the control channels (CCH). The TCHs are intended to carry data such as encoded speech or user data in circuit switched mode, while Packet Data TCHs (PDTCH) are intended to carry user data in packet switched mode. Multiple full rate channels and multiple packet data TCHs can be allocated to the same terminal, which is referred to as multislot configurations and multislot packet configurations respectively. Control channels carry signaling and/or synchronization data. There are various primary control channel categories in GSM systems, including broadcast, common, dedicated, and CTS control channels. The broadcast channels include Frequency Correction Channels (FCCH), Synchronization Channels (SCH), a Broadcast Control Channel (BCCH) as well as Packet BCCH (PBCCH) channels.

The interface between the network and a mobile terminal is often referred to as the radio interface. Radio Resource management (RR) and/or MSC procedures are used to establish, maintain, and release connections that allow a point-to-point dialogue between the network and the terminal. These procedures include "handover" procedures. Handover generally refers to the passing of a call in progress from one channel or cell to another. For example, inter-cell handover refers to the passing of a call from one cell coverage area to another. This typically occurs where the terminal is moving such that it is proximate the border of the cell area, and signal measurements indicate that a transfer of the call to the bordering cell is required or otherwise desirable to ensure proper radio signal quality. Intra-cell handover generally refers to a handover from one channel/timeslot configuration in the serving cell to another channel/timeslot configuration in the same cell. Such a handover may be performed to address interference issues, reduce network congestion, or the like.

Various link control functions are performed between the terminal and its associated BSS, including functions such as handover control, measurement collection and processing, and transmitter power control. Regarding power control issues, it is important that terminals that are sending data to the network use the correct power level. If the terminal power levels are too low, data throughput may suffer due to increased errors resulting from these poor radio conditions. If the terminal power levels are too high, power consumption is not optimal, and other problems such as transmission interference to other channels used by other terminals can occur.

To address these issues, the terminal and the network communicate information relating to the power levels to be used by the terminal. This is generally referred to as adaptive control of the radio frequency (RF) transmit or output power. In GPRS networks, the terminal calculates the correct output power levels based on formulas. Such formulas may include sets of parameters of which the terminal is to obtain from various sources, such as system information messages broadcasted by the network, or from control messages that are sent specifically to each of the terminals. The broadcasted system information messages are currently transmitted by the network in two possible logical channel structures, depending on the base selected by the network operator. For example, if a packet channel structure exists, the system information messages are transmitted by the network on the PBCCH, which is a downlink signal (i.e. from network to terminal) used to broadcast cell-specific information. If a packet channel structure does not exist, the system information messages are broadcasted by the network on the BCCH, which is also a downlink signal used to broadcast cell-specific information.

Based at least in part on the information received by the terminal from the network, the terminal can calculate the output power to which it will transmit data on each individual uplink packet data channel (PDCH). For example, one current formula by which the terminal can calculate its output power is provided in the $3^{rd}$ Generation Partnership Project (3GPP) technical specification 3GPP TS 45.008, V6.6.0, February 2004, entitled "Technical Specification Group GSM/EDGE Radio Access Network; Radio subsystem link control (Release 6) (hereinafter referred to as "TS 45.008"), the content of which is incorporated by reference in its entirety. An output power formula provided by TS 45.008 is shown in Equation 1 below:

$$P_{CH}=\min(\Gamma_0-\Gamma_{CH}-\alpha^*(C+48), PMAX) \qquad \text{Equation 1}$$

In Equation 1, $P_{CH}$ represents the RF output power, and the formula provides a manner in which the terminal can calculate a substantially minimal RF output power while maintaining the quality of the radio links. The channel RF output power, $P_{CH}$, thus represents the minimum of 1) the maximum allowed output power in the cell (PMAX); and 2) the calculation of $\Gamma_0-\Gamma_{CH}-\alpha^*(C+48)$. These values/variables are described below:

$\Gamma_{CH}$ is an MS and channel specific power control parameter, sent to the MS in a Radio Link Control (RLC) control message (see 3GPP TS 44.060). For those uplink Packet Data Channels (PDCHs) for which $\Gamma_{CH}$ has not been defined, the value 0 is used;

$\Gamma_0$=39 dBm for GSM 400, GSM 700, GSM 850 and GSM 900

=36 dBm for DCS1 800 and PCS 1900;

$\alpha$ is a system parameter, broadcast on PBCCH or optionally sent to the MS in an RLC control message (see 3GPP TS 44.018 and 3GPP TS 44.060);

C is the normalized received signal level at the MS as defined in TS 45.008, §10.2.3.1; and PMAX is the maximum allowed output power in the cell, and equals:
  a) GPRS_MS_TXPWR_MAX_CCH if PBCCH or CPBCCH exist; or
  b) MS_TXPWR_MAX_CCH otherwise As can be seen from Equation 1, PMAX represents a key component of the formula, as the result of the calculation of $\Gamma_0-\Gamma_{CH}-\alpha^*(C+48)$ is irrelevant if it is not lower than PMAX.

As previously indicated, PMAX is received in system information messages. For example, when received via the BCCH, information elements including RR information elements may provide the PMAX. One such information element is defined in 3GPP TS 44.018, V6.6.0, February 2004, entitled "Technical Specification Group GSM/EDGE Radio Access Network; Mobile radio interface layer 3 specification; Radio Resource Control (RRC) protocol (Release 6) (hereinafter referred to as "TS 44.018"), the content of which is incorporated by reference in its entirety. This information element is the "cell selection parameters" information element which provides a variety of information about a cell, including the maximum allowed output power in the cell (e.g., PMAX). In accordance with TS 44.018, the PMAX value of the cell selection parameters information element is coded as shown in Table 1 below:

TABLE 1

| 8 | 7 | 6 | 5 | 4 | 3 | 2 | 1 | |
|---|---|---|---|---|---|---|---|---|
| | | | | | | | | octet 1 |
| | | | MS_TXPWR_MAX_CCH | | | | | octet 2 |
| | | | | | | | | octet 3 |

The PMAX value is provided in the 5-bit field MS_TXPWR_MAX_CCH of octet 2, and is coded as the binary representation of the power control level corresponding to the maximum transmission power level a terminal may use when accessing on a Control Channel (CCH) and/or Traffic Channel (TCH). MS_TXPWR_MAX_CCH is thus broadcasted on the BCCH of the cell. A similar 5-bit field, GPRS_MS_TXPWR_MAX_CCH, is broadcasted on PBCCH or Compact PBCCH (CPBCCH) of the serving cell where such channel is provided by the network (see 3GPP TS 44.060). The particular value MS_TXPWR_MAX_CCH or GPRS_MS_TXPWR_MAX_CCH, having a range of 0-31, is then used by the terminal for defining PMAX when calculating the RF output power $P_{CH}$ as shown in Equation 1 above.

According to TS 44.018, the cell selection parameters information element is included in system information messages which are sent to the terminal. More particularly, the cell selection parameters information element (and consequently the MS_TXPWR_MAX_CCH value) is provided in system information types 3 and 4. System information types 3 and 4 are messages sent on the BCCH by the network. In this manner, the terminal can receive the value to be used as PMAX in the calculation of the appropriate RF output power.

Analogously, the value for PMAX may be received via other channels, such as the PBCCH where packet channel structure exists. For example, in the GPRS context, the PBCCH is a unidirectional point-to-multi-point signaling channel from the network to the terminals, and is used to broadcast information to terminals relating to the GPRS radio network organization. In addition to GPRS-specific information, the PBCCH may also broadcast system information about circuit switched services so that a GSM/GPRS terminal does not need to also listen to the BCCH. Packet system information, including a value for PMAX, is provided via the PBCCH in a manner analogous to that described for the BCCH. For example, a packet system information type 3 message is sent by the network on the PBCCH or Packet Associated Control Channel (PACCH) giving information of the BCCH allocation in the neighbor cells and cell selection parameters for serving cell and non-serving cells, where the cell selection parameters include the GPRS_MS_TXPWR_MAX_CCH field.

It can be seen that a primary factor in calculating the channel RF output power, $P_{CH}$, is PMAX, since the calculation for terminal output power uses the lowest of PMAX or $\Gamma_0 - \Gamma_{CH} - \alpha^*(C+48)$. However, in some cases, the terminal does not know this maximum output power parameter for packet transmission. For example, when the terminal operation moves from the dedicated mode to the dual transfer mode (DTM), the maximum output power is correct. On the other hand, when the terminal is in the DTM and experiences a handover to a new cell, the terminal is lacking the correct output power parameters of the new cell. A similar problem exists if the terminal is in the dedicated mode and is handed over one or more times to a new cell in which the terminal requests packet-switched resources. The terminal cannot calculate the correct output power level for PS resources in the new cell while staying in the dedicated mode. Therefore, the terminal is not aware of the correct output power, and specifically the correct maximum output power for packet transfer, when it enters the DTM in the target cell. The present invention addresses these and other shortcomings of the prior art.

Figure 2:
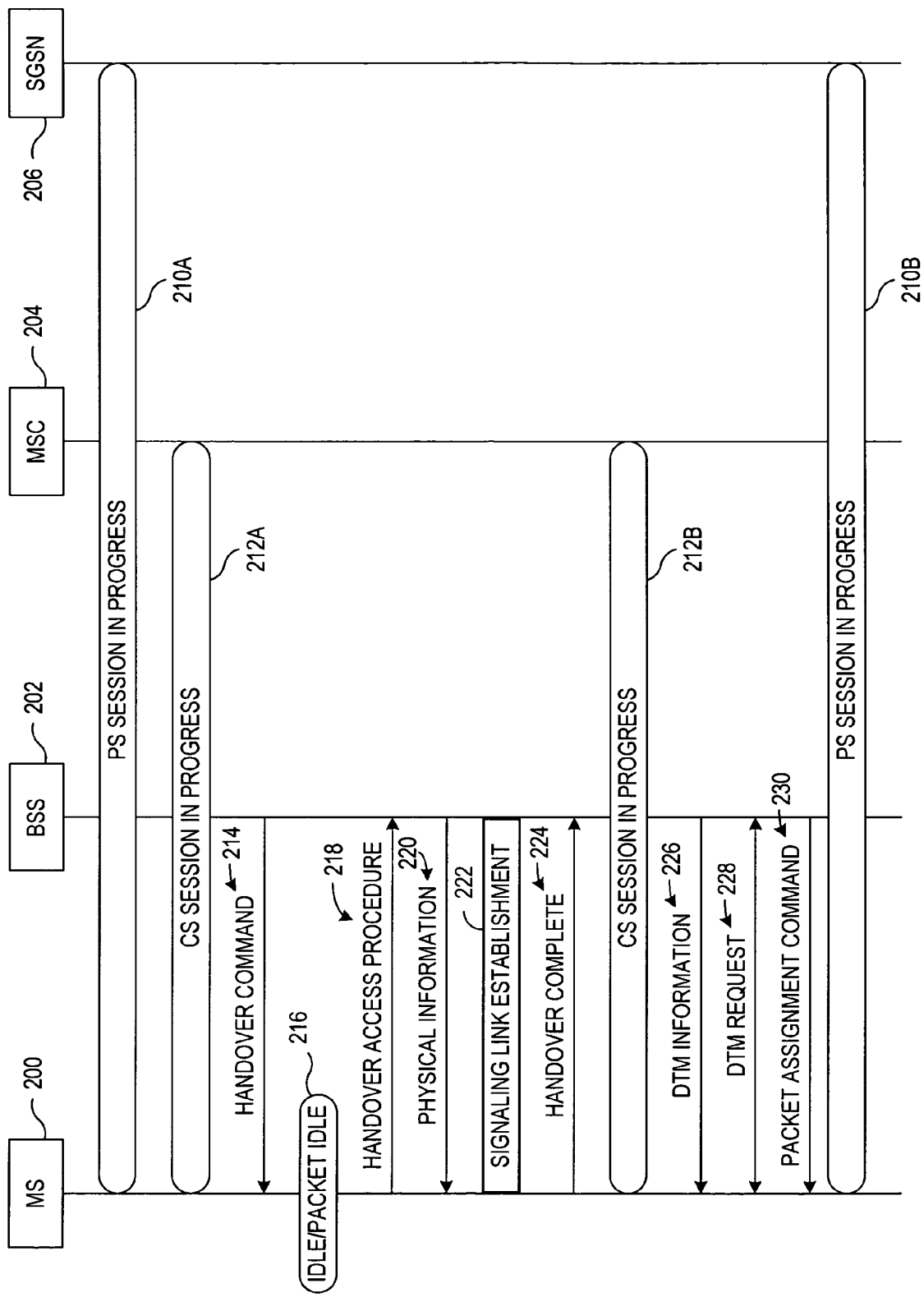
FIG. 2 illustrates a typical signaling scenario associated with a DTM handover.

A typical signaling scenario associated with a DTM handover is first described. FIG. 2 illustrates such a typical signaling scenario. In the illustrated embodiment, the mobile station (MS) 200 represents the terminal. The example further includes network elements including the Base Station System (BSS) 202 (which may include one or more BTSs and a BSC), an MSC 204, and an SGSN 206. MS 200 is assumed to have DTM capabilities and is thus can operate in a Class A mode of operation. A Class A mode of operation refers to a mode where the terminal is attached to both GPRS and other GSM services. The terminal user can make and/or receive calls on the two services simultaneously, such as engaging in a normal GSM voice call and receiving GPRS data packets at the same time. Both resources (CS and PS) are allocated in the same frequency band either in one timeslot (i.e. single timeslot allocation) or in adjacent timeslots (i.e. multislot allocation). In addition, when the terminal is in dedicated mode, it cannot monitor its BCCH/PBCCH. All required system information (while in dedicated mode) is provided via SACCH with SI5 or SI6.

One group of procedures includes those related to the change of the serving cell when the MS 200 is in DTM, namely "handover." Referring to FIG. 2, a PS session 210A may be in progress, which operates between the MS 200 and the SGSN 206 and involves the BSS 202 and MSC 204. As indicated in connection with FIG. 1, an SGSN 206 serves terminals that support GPRS by sending or receiving packets via a respective BSS 202, and more particularly via the BSC (see FIG. 1) in the context of GSM systems. Further, because DTM and other Class A modes of operation allow simultaneous resource allocation, a CS session 212A (e.g., voice call) may also be in progress. If the MS 200 simultaneously has both connections 210A, 212A in progress (e.g., PS and CS connections), then the MS 200 is in dual transfer mode, which is assumed for purposes of the present example.

When a handover is to occur, the CS connection is handed over, and packet resources are released. More particularly, a handover command 214 message is sent from the network, particularly from the BSS 202, to the MS 200. The handover command 214 message describes the CS resources in the target cell. A handover command 214 is a message that may be sent on the main DCCH by the network to the terminal to change the dedicated channel configuration. Table 1 below illustrates an exemplary handover command, as set forth in TS 44.018:

TABLE 1

| IEI | Information element | Type/Reference | Presence | Format | length |
|---|---|---|---|---|---|
| | RR management Protocol Discriminator | Protocol Discriminator 10.2 | M | V | ½ |
| | Skip Indicator | Skip Indicator 10.3.1 | M | V | ½ |
| | Handover Command Message Type | Message Type 10.4 | M | V | 1 |
| | Cell Description | Cell description 10.5.2.2 | M | V | 2 |
| | Description of the first channel, after time | Channel Description 2 10.5.2.5a | M | V | 3 |
| | Handover Reference | Handover Reference 10.5.2.15 | M | V | 1 |
| | Power Command and Access type | Power Command and Access type 10.5.2.28a | M | V | 1 |
| D- | Synchronization Indication | Synchronization Indication 10.5.2.39 | O | TV | 1 |
| 02 | Frequency Short List, after time | Frequency Short List 10.5.2.14 | C | TV | 10 |
| 05 | Frequency List, after time | Frequency List 10.5.2.13 | C | TLV | 4-131 |
| 62 | Cell Channel Description | Cell Channel Description 10.5.2.1b | C | TV | 17 |
| 10 | Description of the multislot configuration | Multislot Allocation 10.5.2.21b | C | TLV | 3-12 |
| 63 | Mode of the First Channel(Channel Set 1)) | Channel Mode 10.5.2.6 | O | TV | 2 |
| 11 | Mode of Channel Set 2 | Channel Mode 10.5.2.6 | O | TV | 2 |
| 13 | Mode of Channel Set 3 | Channel Mode 10.5.2.6 | O | TV | 2 |
| 14 | Mode of Channel Set 4 | Channel Mode 10.5.2.6 | O | TV | 2 |
| 15 | Mode of Channel Set 5 | Channel Mode 10.5.2.6 | O | TV | 2 |
| 16 | Mode of Channel Set 6 | Channel Mode 10.5.2.6 | O | TV | 2 |
| 17 | Mode of Channel Set 7 | Channel Mode 10.5.2.6 | O | TV | 2 |
| 18 | Mode of Channel Set 8 | Channel Mode 10.5.2.6 | O | TV | 2 |
| 64 | Description of the Second Channel, after time | Channel Description 10.5.2.5 | O | TV | 4 |
| 66 | Mode of the Second Channel | Channel Mode 2 10.5.2.7 | O | TV | 2 |
| 69 | Frequency Channel Sequence, after time | Frequency Channel Sequence 10.5.2.12 | C | TV | 10 |
| 72 | Mobile Allocation, after time | Mobile Allocation 10.5.2.21 | C | TLV | 3-10 |
| 7C | Starting Time | Starting Time 10.5.2.38 | O | TV | 3 |
| 7B | Real Time Difference | Time Difference 10.5.2.41 | C | TLV | 3 |
| 7D | Timing Advance | Timing Advance 10.5.2.40 | C | TV | 2 |
| 12 | Frequency Short List, before time | Frequency Short List 10.5.2.14 | C | TV | 10 |
| 19 | Frequency List, before time | Frequency List 10.5.2.13 | C | TLV | 4-131 |
| 1C | Description of the First Channel, before time | Channel Description 2 10.5.2.5a | O | TV | 4 |
| 1D | Description of the Second Channel, before time | Channel Description 10.5.2.5 | O | TV | 4 |
| 1E | Frequency channel sequence before time | Frequency channel sequence 10.5.2.12 | C | TV | 10 |
| 21 | Mobile Allocation, before time | Mobile Allocation 10.5.2.21 | C | TLV | 3-10 |
| 9- | Cipher Mode Setting | Cipher Mode Setting 10.5.2.9 | O | TV | 1 |
| 01 | VGCS target mode Indication | VGCS target mode Indication 10.5.2.42a | O | TLV | 3 |
| 03 | Multi-Rate configuration | MultiRate configuration 10.5.2.21aa | O | TLV | 4-8 |
| 76 | Dynamic ARFCN Mapping | Dynamic ARFCN Mapping 10.5.2.11b | O | TLV | 6-34 |

An idle state 216 occurs, where packet resources are released after the MS 200 has received the handover command message 214. A handover access procedure 218 with the new BTS occurs. Physical information 220 from the new BTS of the BSS 202 is sent to the MS 200. Signaling link establishment 222 takes place and a handover complete 224 message is sent from the MS 200 to the BSS 202. The CS session in progress 212B continues after the handover. Where the MS 200 was in DTM in the old cell (as in the current example), a DTM information message 226 is sent from the BSS 202 to the MS 200. The DTM information message 226 includes information to resume the GPRS operation immediately. Once the MS 200 has the necessary information, it will perform a cell update or routing area (RA) update procedure. A DTM request 228 is sent from the MS 200 to the BSS 202. A packet assignment command 230 is sent to the MS 200. The packet assignment command 230 is sent on the main Dedicated Control CHannel (DCCH) by the network to the terminal 200 to change the channel configuration to a multislot configuration with CS and PS connections. The PS session in progress 210B then continues after the handover.

Currently, the value of the power level parameter (GPRS_MS_TXPWR_MAX_CCH if PBCCH or CPBCCH exist, or MS_TXPWR_MAX_CCH otherwise) that is used for the PMAX value is used as the initial output power level at the new cell after CS handover. In accordance with the present invention, the power level parameter is sent in the handover command 214 as a maximum output power level for PS traffic after CS handover. The MS 200 may or may not have been in the DTM before the CS handover, and it may request PS resources after handover. The power level parameter may alternatively be provided via signaling messages, as described more fully below.

Figure 3:
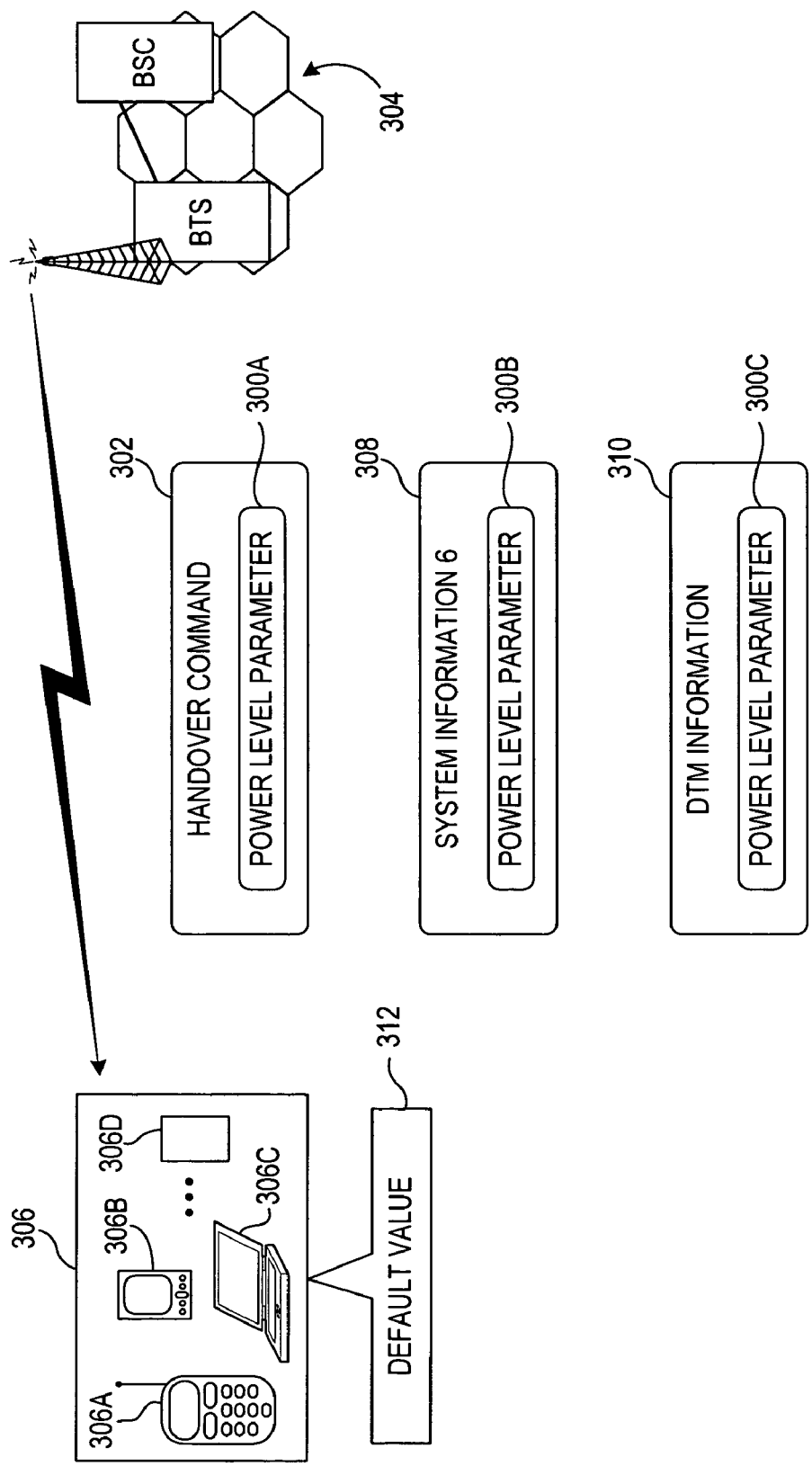
FIG. 3 illustrates various representative manners of providing the power level parameter to the terminal for PS power control for DTM after CS handover in accordance with the present invention.

FIG. 3 illustrates various representative manners of providing the power level parameter to the terminal for PS power control for DTM after CS handover. A first embodiment provides the power level parameter 300A in a handover command 302 from the BSS 304 to the terminal 306. The terminal may include any terminal/mobile station, such as a mobile phone 306A, personal digital assistant (PDA) 306B, computing device 306C, or other terminal 306D. The power level parameter 300A represents the maximum output power level for PS traffic after CS handover. The handover command 302 is provided from the BSS to the terminal, as was also illustrated in FIG. 2 where a handover command 214 is illustrated as being sent from the BSS 202 to the MS 200.

Currently the value of the power level parameter is used as initial output power level at the new cell after CS handover. The parameter is valid until power control starts either on a TCH, FACCH, SACCH, PDTCH or SDCCH, e.g., until a new power control command is received on the SACCH channel. The terminal shall employ the most recently commanded power control level appropriate to each above mentioned channel for all transmitted bursts.

Based on the existing power control handling, it is possible for the network to set the power level parameter (the initial CS output power for the new cell) to a level that is suitable to replace the PMAX parameter for PS power control on the new cell.

When CS signaling starts, the network commands the terminal to use a lower power level for the CS connection if feasible, based on radio conditions. In the DTM case, the value of the power level parameter is used as a PMAX value when calculating the terminal (PS) output power as specified in TS 45.008. It is noted that the invention makes it possible to set the maximum output power for packet transfer after DTM handover without any signaling changes.

In an embodiment using the handover command, the invention makes use of an existing "power level" parameter field in the handover command. As was shown in Table 1 above, the handover command includes an information element (IE) referred to as the "Power Command and Access type." This IE may be coded as shown in Table 2 below:

TABLE 2

| 8 | 7 | 6 | 5 | 4 | 3 | 2 | 1 | |
|---|---|---|---|---|---|---|---|---|
| Power Command and Access Type IEI | | | | | | | | octet 1 |
| ATC | EPC mode | FPC_EPC | POWER LEVEL | | | | | |
| | | | | | | | | octet 2 |

The purpose of this information element (IE) is to provide the power level to be used by an MS and the indication that the MS can avoid the transmission of handover access. The various fields are defined in Table 3 as follows:

TABLE 3

ATC (Access Type Control) (octet 2)
Bit 8

0   Sending of Handover access is mandatory
   1   Sending of Handover access is optional
EPC_mode (octet 2)
The EPC mode field (octet 2) indicates whether the assigned channel(s) shall be in enhanced power control (EPC) mode.
It is only valid for channels on which EPC may be used.
It is coded as follows:
Value Channel(s) not in EPC mode
Channel(s) in EPC mode
FPC_EPC (octet 2)
The FPC_EPC field (octet 2) has different interpretation depending on the channel mode of the assigned channel (s) and the value of the EPC mode field.
If the channel mode is such that fast power control (FPC) may be used, the FPC_EPC field indicates whether Fast Measurement Reporting and Power Control mechanism is used. It is coded as follows:
   Value 0   FPC not in use
   1   FPC in use
If the channel mode is such that EPC may be used and the EPC mode field indicates that the channel is in EPC mode, the FPC_EPC field indicates whether EPC shall be used for uplink power control. It is coded as follows:
   Value 0   EPC not in use for uplink power control
   1   EPC in use for uplink power control
Power level (octet 2)
The power level field is coded as the binary
Representation of the "power control level", see
3GPP TS 3GPP TS 45.005. This value shall be
used by the mobile station According to 3GPP
TS 45.008.
Range: 0 to 31.

In accordance with one embodiment of the invention, the invention makes use of the existing "POWER LEVEL" parameter. However, this POWER LEVEL parameter is currently only used to control the MS output power for the circuit-switched (CS) resources after handover, until an updated power control command is received through the SACCH channel from the new cell. In accordance with one embodiment of the invention, the POWER LEVEL parameter is used as a maximum output power level for packet-switched (PS) traffic after CS handover. More particularly, the initial output power for the CS resources, after CS handover, equals the maximum allowed power at the target cell (or at least close to the maximum allowed power at the target cell). The PMAX parameter used in the PS power control formula equals the maximum power allowed in the cell. This allows the value of the power level parameter being used as PMAX, i.e. if the PMAX is not elsewhere known, the power level parameter value may be read from the most recent handover command as a valid value for PMAX. Thus, the power level parameter is a different parameter from PMAX, but the power level parameter may be used to initialize PMAX.

Alternate embodiments are also illustrated in FIG. 3, where the power level parameter is provided via signaling messages. After DTM handover, the terminal 306 shall receive a message such as a system information 6 (SI6) 308 or DTM information 310 message to check whether or not DTM is supported in the new cell. For example, such a DTM information message was illustrated in FIG. 2 as the DTM information message 226. In accordance with various embodiments of the invention, a power level parameter 300B, 300C used as PMAX may be provided in such an SI6 308 and/or DTM information 310 message respectively. In these embodiments, the power level parameter 300B, 300C represents a new parameter to add to such signaling messages.

Another alternative embodiment is to use a specific default value 312 for the PMAX parameter. Such a default value 312 may be stored at the terminal 306, or otherwise accessible to the terminal from the network or elsewhere. An example of such a default value 312 may be, for example, +30 dBm for the GSM 1900 MHz frequency band. Other predetermined values may be used, and any particular default value 312 may be used depending on the particular network system (e.g., GSM 400, GSM 900, GSM 850, GSM 700, GSM 1900, DCS 1800, etc.). The default value 312 may also be set equal to the terminal maximum output power. Consistent and known PS output power would be reached even if the PMAX parameter were not available, such as after a CS handover. However, any cell-specific lower maximum output power could be achieved by setting the PS power control parameter "alpha" to zero, and the other power control parameters according to the intended maximum output power.

Figure 4:
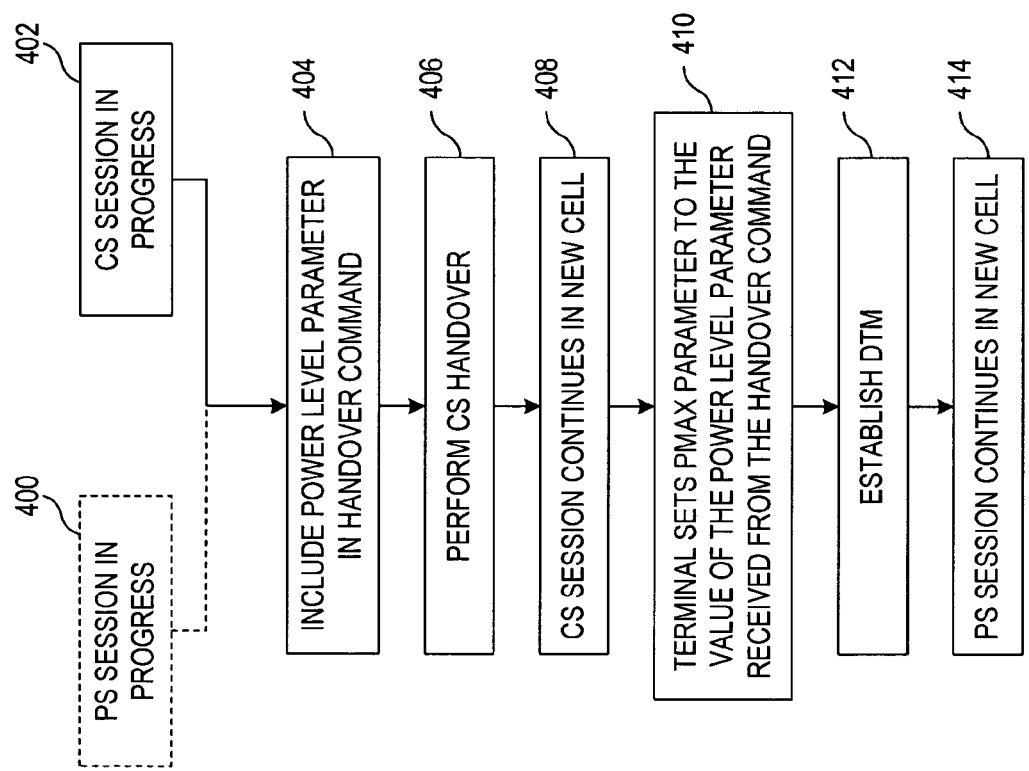

FIG. 4 is a flow diagram illustrating one embodiment for effecting PS power control for DTM after CS handover in accordance with the present invention. Optionally a PS session and at least a CS session are in progress, as indicated by blocks 400, 402. The power level parameter as included in the handover command is set to an appropriate value, as indicated at block 404. The CS handover is performed 406, and the CS session continues 408 in the new cell. The terminal sets 410 the PMAX parameter to the value of the power level parameter received from the handover command. The received power level parameter may be used to determine the PMAX value in calculating $P_{CH}$, as shown in Equation 1. The DTM is established 412, such as by providing the DTM information from the BSS to the terminal, sending a DTM request from the terminal to the BSS, and transmitting a packet assignment command from the BSS to the terminal. The PS session then continues 414 in the new cell, using the calculated terminal output power level.

FIG. 5A illustrates another flow diagram of an embodiment for effecting PS power control for DTM after CS handover in accordance with the present invention. Optionally a PS and at least a CS session are in progress, as indicated by blocks 500, 502. The CS handover is performed 504, and the CS session continues 506 in the new cell. As depicted at block 508, the power level parameter is included in a signaling message(s), such as the DTM information message, SI6 message, or other signaling message. The DTM is established 512, and the PS session then continues 514 in the new cell using the calculated terminal output power level, and specifically using the power level parameter value, as received from the SI6 message or DTM information message, for the PMAX parameter.

FIG. 5B illustrates another flow diagram of an embodiment for effecting PS power control for DTM after CS handover in accordance with the present invention. Optionally a PS and at least a CS session are in progress, as indicated by blocks 550, 552. The CS handover is performed 554, and the DTM is established 556. In this embodiment, the PS session continues 558 in the new cell using a default PMAX parameter if no other PMAX value is available, such as if no power level parameter is provided via the network.

Figure 6:
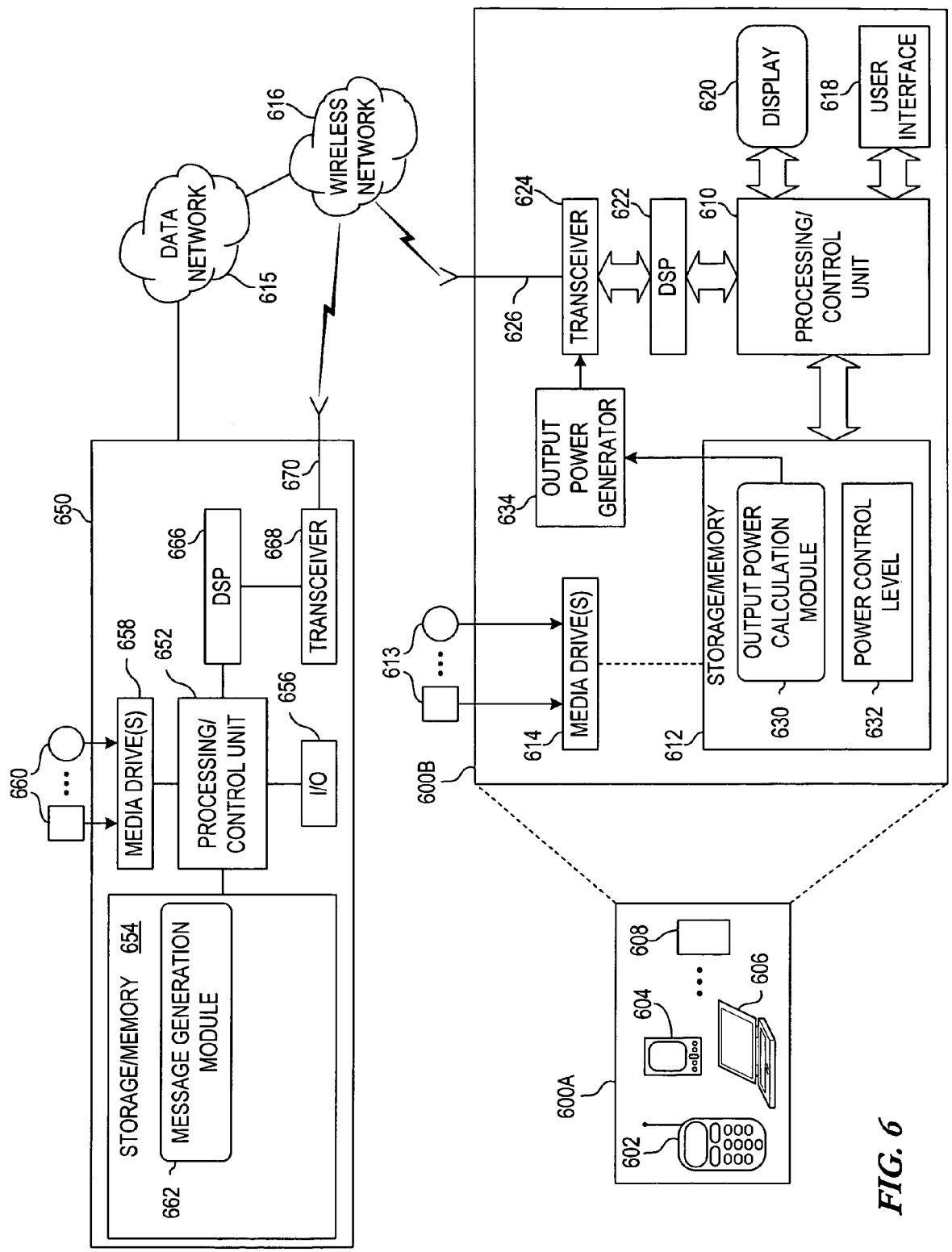
FIG. 6 illustrates a representative system in which the present invention may be implemented or otherwise utilized.

Hardware, firmware, software or a combination thereof may be used to perform the functions and operations in accordance with the invention. The terminals in accordance with the invention include any communication device capable of communicating over-the-air (OTA) with wireless networks. Such terminals include, for example, mobile phones, Personal Digital Assistants (PDAs), computing devices, and other wireless communicators. A representative system in which the present invention may be implemented or otherwise utilized is illustrated in FIG. 6.

The system includes one or more terminals 600A such as, for example, a mobile phone 602, PDA 604, computing device 606, or other communication device 608 capable of OTA communication. The terminal 600A utilizes computing systems to control and manage the conventional device activity as well as the functionality provided by the present invention. For example, the representative terminal 600B includes a processing/control unit 610, such as a microprocessor, controller, reduced instruction set computer (RISC), or other central processing module. The processing unit 610 need not be a single device, and may include one or more processors. For example, the processing unit may include a master processor and one or more associated slave processors coupled to communicate with the master processor.

The processing unit 610 controls the basic functions of the terminal 600B as dictated by programs available in the program storage/memory 612. The storage/memory 612 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the terminal. The storage 612 may also include one or more of other types of read-only memory (ROM) and programmable and/or erasable ROM, random access memory (RAM), subscriber interface module (SIM), wireless interface module (WIM), smart card, or other fixed or removable memory device/media. The programs may also be provided via other media 613, such as disks, CD-ROM, DVD, or the like, which are read by the appropriate media drive(s) 614. The relevant software for carrying out terminal operations in accordance with the present invention may also be transmitted to the terminal 600B via data signals, such as being downloaded electronically via one or more networks, such as the data network 615 or other data networks, and an intermediate wireless network(s) 616.

For performing other standard terminal functions, the processor 610 is also coupled to user-interface (UI) 618 associated with the terminal 600B. The UI 618 may include, for example, a keypad, function buttons, microphone, joystick, scrolling mechanism (e.g., mouse, trackball), touch pad/screen, or other user entry mechanisms (not shown). These and other UI components are coupled to the processor 610 as is known in the art. A display device 620 may also be associated with the terminal 600B.

The illustrated terminal 600B also includes conventional circuitry for performing wireless transmissions over the wireless network(s) 616. The DSP 622 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 624 transmits outgoing radio signals and receives incoming radio signals, generally by way of an antenna 626.

In one embodiment, the storage/memory 612 stores the various client programs used in connection with the present invention. For example, the storage/memory 612 includes storage to store the maximum power control level 632 provided via the network 616 to the terminal 600B. The storage/memory 612 also includes an output power calculation module 630, operable in connection with the processor 610 in one embodiment of the present invention. In one embodiment, the output power calculation module 630 includes software and/or firmware operable with the processor 610 to define the terminal output power level that is to be used by the terminal, such as performing the calculation shown in Equation 1 above. Based on the defined value, the output power generation module 634 establishes the proper output power for which the transceiver 624 is to transmit communication signals. These terminal modules are representative of the types of functional modules that may be provided on a terminal in accordance with the invention, and are not intended to represent an exhaustive list.

FIG. 6 also depicts a representative computing system 650 operable on the network for generating the messages to the terminal to provide at least the maximum terminal output power level for use by the terminal in establishing the proper terminal output power. In one embodiment of the invention, the computing system 650 represents functionality at a Base Station System (BSS). Alternatively, the functionality described for the computing system 650 in FIG. 6 may be provided in other network entities that communicate assignment messages and/or system information messages to terminals.

In one embodiment, the computing system 650 includes a processing arrangement 652, which may be coupled to the storage/memory 654. The processor 652 carries out a variety of standard computing functions as is known in the art, as dictated by software and/or firmware instructions. The storage/memory 654 may represent firmware, media storage, and/or memory. The processor 652 may communicate with other internal and external components through input/output (I/O) circuitry 656. The computing system 650 may also include media drives 658, such as hard and floppy disk drives, CD-ROM drives, DVD drives, and other media 660 capable of reading and/or storing information. In one embodiment, software for carrying out the operations at the computing system 650 in accordance with the present invention may be stored and distributed on CD-ROM, diskette, removable memory, or other form of media capable of portably storing information, as represented by media devices 660. Such software may also be transmitted to the system 650 via data signals, such as being downloaded electronically via a network such as the data network 615, Local Area Network (LAN) (not shown), wireless network 616, and/or any combination thereof.

In accordance with one embodiment of the invention, the storage/memory 654 and/or media devices 660 store the various programs and data used in connection with the present invention. For example, the message generation module 662 is operable with the processor 652 to generate the various messages that incorporate the power level parameter for transmission to the terminal 600B. The message generation module 662 may therefore generate the handover command, and/or signaling messages (e.g., DTM information; SI6; etc.) that include the power level parameter. The illustrated computing system 650 also includes DSP circuitry 666, at least one transceiver 668, and an antenna 670 for facilitating the communications with the terminal 600B and/or other devices.

Using the foregoing specification, some embodiments of the invention may be implemented as a machine, process, or article of manufacture by using standard programming and/or engineering techniques to produce programming software, firmware, hardware or any combination thereof. Any resulting program(s), having computer-readable program code, may be embodied within one or more computer-usable media such as memory devices or transmitting devices, thereby making a computer program product, computer-readable medium, or other article of manufacture according to the invention. As such, the terms "computer-readable medium" and/or "computer program product" as used herein are intended to encompass a computer program existing permanently, temporarily, or transitorily on any computer-usable medium such as on any memory device or in any transmitting device.

For example, one embodiment of the invention includes a computer-readable medium having instructions stored thereon that are executable by a computer system for controlling the output power level at a terminal. The instructions executable by the computing system and stored on the computer-readable medium perform steps including receiving a channel assignment message at the terminal from the network where the channel assignment message includes a first maximum terminal output power level indicator, defining a terminal output power level to be used as the terminal's output power level based on the first maximum terminal output power level indicator received via the channel assignment message, setting a terminal output power level of the terminal to correspond to the defined terminal output power level, and transmitting data from the terminal at the terminal output power level.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

Thus, the present invention provides various systems, apparatuses, computer program products, and methods for controlling the output power level of over-the-air (OTA) transmission signals from a terminal operable on a network. In one method, a power level parameter is provided to the terminal via a circuit-switched (CS) handover command, and the power level parameter for packet-switched (PS) power control is copied or otherwise utilized for PS traffic after CS handover. In a more particular embodiment, a packet-switched (PS) output power level to be used as the terminal's output power level for PS traffic after CS handover is defined, using the power level parameter received via the CS handover command. In another particular embodiment, defining a PS output power level involves using a default value in defining the PS output power level if the power level parameter is not provided via the CS handover command. In accordance with another embodiment, a method is provided for controlling the output power level of over-the-air (OTA) transmission signals from a terminal operable on a network. At least one signaling message is generated at the network, and a power level parameter is associated with the signaling message(s). The signaling message(s) is transmitted from the network to the terminal, and a PS output power level to be used as the terminal's output power level for PS traffic after CS handover is defined, using the power level parameter received via the at least one signaling message. In a more particular embodiment, the signaling message(s) determines whether or not dual transfer mode (DTM) is supported in the new cell. In another particular embodiment, the signaling message(s) includes a point-to-point system information message, such as, for example, a system information 6 (SI6) message, a DTM information message, etc. In another particular embodiment, defining a PS output power level involves using a default value in defining the PS output power level if the power level parameter is not provided via the signaling message.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method comprising:
    generating at least one signaling message at a network;
        associating, with the at least one signaling message, a packet-switched-specific power control parameter for a terminal operating in a dual transfer mode, wherein the signaling message comprises at least one of a system information 6 (SI6) message and a dual transfer mode information message, and wherein the packet-switched-specific power control parameter comprises a maximum power control parameter; and
        transmitting the at least one signaling message from the network to the terminal via a circuit-switched, point-to-point communication wherein the at least one signaling message facilitates defining a maximum packet-switched output power level (PMAX) using the maximum power control parameter received via the at least one signaling message, and defining a packet-switched output power level $P_{CH}$ to be used as the terminal's output power level for packet-switched traffic in the dual transfer mode according to the formula $P_{CH=min}(\Gamma_0 - \Gamma_{CH} - \alpha*(C+48), PMAX)$, wherein: $\Gamma_0$ comprises an architecture specific power control parameter; $\Gamma_{CH}$ comprises a terminal and channel specific power control parameter; $\alpha$ comprises a system parameter broadcast on a control channel or sent to the terminal; and C comprises a normalized received signal level at the terminal.

2. The method of claim 1, wherein defining the packet-switched output power level comprises defining the packet-switched output power level for packet-switched traffic after a circuit-switched handover.

3. The method of claim 1, wherein transmitting the at least one signaling message comprises transmitting the at least one signaling message via a slow associated control channel (SACCH).

4. The method of claim 1, wherein the at least one signaling message determines whether or not the dual transfer mode is supported in a new cell.

5. The method of claim 1, wherein the at least one signaling message comprises a point-to-point system information message.

6. The method of claim 1, wherein defining a packet-switched output power level comprises using a default value in defining the packet-switched output power level if the power control parameter is not provided via the signaling message.

7. The method of claim 1, wherein the terminal is capable of simultaneously maintaining a circuit-switched data session and a packet-switched data session via the network.

8. A method comprising:
    receiving a packet-switched specific power control parameter via a circuit-switched handover command at a terminal operating in a dual-transfer mode via a circuit-switched network and a packet-switched network, wherein the packet-switched specific power control parameter comprises a maximum power control parameter;
    defining a maximum packet-switched output power level (PMAX) based on the maximum power control parameter;
    defining a packet-switched output power level $P_{CH}$ to be used as the terminal's output power level for packet-switched traffic according to the formula $P_{CH=min}(\Gamma_0 - \Gamma_{CH} - \alpha*(C+48), PMAX)$, wherein: $\Gamma_0$ comprises an architecture specific power control parameter; $\Gamma_{CH}$ comprises a terminal and channel specific power control parameter; $\alpha$ comprises a system parameter broadcast on a control channel or sent to the terminal; and C comprises a normalized received signal level at the terminal; and
    utilizing the packet-switched specific power control parameter for packet-switched power control for packet-switched traffic at the terminal.

9. The method of claim 8, further comprising defining a packet-switched output power level to be used as the terminal's output power level for packet-switched traffic using the packet-switched specific power control parameter received via the circuit-switched handover command.

10. The method of claim 9, wherein defining the packet-switched output power level comprises using a default value in defining the packet-switched output power level if the packet-switched specific power control parameter is not provided via the circuit-switched handover command.

11. The method of claim 8, wherein providing the maximum power control parameter to the terminal via the circuit-switched handover command comprises placing the maximum power control parameter in an existing power level information element of the circuit-switched handover command.

12. The method of claim 8, wherein the terminal is capable of simultaneously maintaining a circuit-switched data session and a packet-switched data session via the network.

13. An apparatus comprising:
    a transceiver interface-receiving a packet-switched specific, maximum power control parameter via a circuit-switched point-to-point signaling message, wherein the circuit-switched point-to-point signaling message comprises at least one of a system information 6 (SI6) message and a dual transfer mode information message; and
    a processor configured to:
        define a maximum packet-switched output power level (PMAX) based on the maximum power control parameter;
        define a packet-switched output power level $P_{CH}$ to be used as the terminal's output power level for packet-switched traffic according to the formula $P_{CH}=min(\Gamma_0 - \Gamma_{CH} - \alpha*(C+48), PMAX)$, wherein: $\Gamma_0$ comprises an architecture specific power control parameter; $\Gamma_{CH}$ comprises a terminal and channel specific power control parameter; α comprises a system parameter broadcast on a control channel or sent to the terminal; and C comprises a normalized received signal level at the terminal; and utilize the maximum power control parameter to control a terminal output power for packet-switched network traffic for operating in a dual transfer mode.

14. The apparatus of claim 13, wherein the processor is further configured to utilize the maximum power control parameter to control the terminal's output power for packet-switched traffic after a circuit-switched handover.

15. The apparatus of claim 13, wherein the transceiver is capable of receiving the maximum power control parameter via a slow associated control channel (SACCH).

16. The apparatus of claim 13, wherein the processor is farther configured to define a packet-switched output power level using the maximum power control parameter, the packet-switched output power level to be used as the terminal's output power level for packet-switched traffic after a circuit-switched network handover.

17. The apparatus of claim 16, wherein defining the packet-switched output power level comprises using a default value in defining the packet-switched output power level if the maximum power control parameter is not provided via the signaling message.

18. The apparatus of claim 13, wherein the terminal is capable of simultaneously maintaining sessions in each of the circuit-switched and packet-switched networks.

19. An apparatus comprising:
a transceiver interface receiving a packet-switched specific, maximum power control parameter via a circuit-switched handover command for a terminal operating in a dual transfer mode; and
a processor configured to:
define a maximum packet-switched output power level (PMAX) based on the maximum power control parameter;
define a packet-switched output power level $P_{CH}$ to be used as the terminal's output power level for packet-switched traffic according to the formula $P_{CH}=\min(\Gamma_0-\Gamma_{CH}-\alpha*(C+48), PMAX)$, wherein: $\Gamma_0$ comprises an architecture specific power control parameter; $\Gamma_{CH}$ comprises a terminal and channel specific power control parameter; α comprises a system parameter broadcast on a control channel or sent to the terminal; and C comprises a normalized received signal level at the terminal; and
utilize the maximum power control parameter for packet-switched power control for packet-switched network traffic.

20. The apparatus of claim 19, wherein the processor is further configured to define a packet-switched output power level using the maximum power control parameter, the packet-switched output power level to be used as the terminal's output power level for packet-switched traffic.

21. The apparatus of claim 20, wherein defining the packet-switched output power level comprises using a default value in defining the packet-switched output power level if the maximum power control parameter is not provided via the circuit-switched handover command.

22. The apparatus of claim 19, wherein the maximum power control parameter is included in an existing power level information element of the circuit-switched handover command.

23. The apparatus of claim 19, wherein the terminal is capable of simultaneously maintaining sessions in each of the circuit-switched (CS) and packet-switched (PS) networks.

24. A computer-readable medium having instructions stored thereon which are executable by an apparatus to perform operations comprising:
receiving a packet-switched specific maximum power control parameter via a network from at least one of a circuit-switched handover command and a circuit-switched point-to-point signaling message directed to a terminal operating in a dual transfer mode, wherein the circuit-switched point-to-point signaling message comprises at least one of a system information 6 (SI6) message, a dual transfer mode information message;
defining a maximum packet-switched output power level (PMAX) and a packet-switched output power level based on the maximum power control parameter, wherein the packet-switched output power level is used as the terminal's output power level for packet-switched traffic;
defining a packet-switched output power level P based on the maximum power control parameter according to the formula $P_{CH}=\min(\Gamma_0-\Gamma_{CH}-\alpha*(C+48), PMAX)$, wherein: $\Gamma_0$ comprises an architecture specific power control parameter; $\Gamma_{CH}$ comprises a terminal and channel specific power control parameter; α comprises a system parameter broadcast on a control channel or sent to the terminal; and C comprises a normalized received signal level at the terminal; and
establishing a packet-switched data session using the packet-switched output power level.

25. An apparatus comprising:
a processor configured to determine a packet-switched specific maximum power control parameter usable by a terminal for packet-switched power control for packet-switched network traffic in a dual transfer mode of the terminal; and
a transceiver sending the maximum power control parameter to the terminal via a circuit-switched handover command to facilitate defining, at the terminal, a maximum packet-switched output power level (PMAX) and a packet-switched output power level based on the maximum power control parameter,
wherein the packet-switched output power level is used as the terminal's output power level for packet-switched traffic, and wherein the packet-switched output power level is defined according to the formula $P=\min(\Gamma_0-\Gamma_{CH}-\alpha*(C+48), PMAX)$, wherein: $\Gamma_0$ comprises an architecture specific power control parameter; $\Gamma_{CH}$ comprises a terminal and channel specific power control parameter; α comprises a system parameter broadcast on a control channel or sent to the terminal; and C comprises a normalized received signal level at the terminal.

26. The apparatus of claim 25, wherein the maximum power control parameter is included in an existing power level information element of the circuit-switched handover command.

27. The apparatus of claim 25, wherein the terminal is capable of simultaneously maintaining sessions in each of the circuit-switched and packet-switched networks.

28. An apparatus comprising:
a processor configured to determine a packet-switched specific, maximum power control parameter usable by the terminal for packet-switched power control for packet-switched network traffic in a dual transfer mode of the terminal; and
a transceiver sending the maximum power control parameter to the terminal via a circuit-switched point-to-point signaling message, wherein the circuit-switched pointto-point signaling message comprises at least one of a system information 6 (SI6) message and a dual transfer mode information message that facilitates defining, at the terminal, a maximum packet-switched output power level (PMAX) and a packet-switched output power level based on the maximum power control parameter, wherein the packet-switched output power level is used as the terminal's output power level for packet-switched traffic, and wherein the packet-switched output power level is defined according to the formula $P=\min(\Gamma_0-\Gamma_{CH}-\alpha*(C+48), PMAX)$, wherein: $\Gamma_0$ comprises an architecture specific power control parameter; $\Gamma_{CH}$ comprises a terminal and channel specific rower control parameter; $\alpha$ comprises a system parameter broadcast on a control channel or sent to the terminal; and C comprises a normalized received signal level at the terminal.

29. The apparatus of claim 28, wherein the terminal simultaneously maintains sessions in each of the circuit-switched and packet-switched networks.

30. A computer-readable medium having instructions stored thereon which are executable by an apparatus to perform operations comprising:

determining a packet-switched(PS)-specific maximum power control parameter usable by a terminal for packet-switched power control for packet-switched network traffic in a dual transfer mode of the terminal; and sending the maximum power control parameter to the terminal via at least one of a circuit-switched handover command and a circuit-switched point-to-point signaling message, wherein the circuit-switched point-to-point signaling message comprises at least one of system information 6 (SI6) message and a dual transfer mode information message that facilitates defining, at the terminal, a maximum packet-switched output power level (PMAX) and a packet-switched output power level based on the maximum power control parameter, wherein the packet-switched output power level is used as the terminal's output power level for packet-switched traffic, and wherein the packet-switched output power level is defined according to the formula $P=\min(\Gamma_0-\Gamma_{CH}-\alpha*(C+48), PMAX)$, wherein: $\Gamma_0$ comprises an architecture specific power control parameter; $\Gamma_{CH}$ comprises a terminal and channel specific power control parameter; $\alpha$ comprises a system parameter broadcast on a control channel or sent to the terminal; and C comprises a normalized received signal level at the terminal.

31. A system comprising:

means for generating network message that includes at least one of a circuit-switched handover command and a circuit-switched point-to-point signaling message wherein the circuit-switched point-to-point signaling message comprises at least one of system information 6 (SI6) message and a dual transfer mode information message;

means for associating a packet-switched specific, maximum output power control value with the network message;

means for transmitting the network message from the network to a terminal operating in a dual transfer mode;

means for defining a maximum packet-switched output power level (PMAX) based on the maximum output power control value, wherein the packet-switched output power level is used as the terminal's output power level for packet-switched traffic, and wherein defining the packet-switched output power level comprises calculating the packet-switched output power level P according to the formula $P=\min(\Gamma_0-\Gamma_{CH}-\alpha*(C+48), PMAX)$, wherein: $\Gamma_0$ comprises an architecture specific power control parameter; $\Gamma_{CH}$ comprises a terminal and channel specific power control parameter; $\alpha$ comprises a system parameter broadcast on a control channel or sent to the terminal; and C comprises a normalized received signal level at the terminal; and means for defining a packet-switched output power level of the terminal using the maximum output power control value received via the network message.

* * * * *

UNITED STATES PATENT AND TRADEMARK OFFICE
CERTIFICATE OF CORRECTION

PATENT NO. : 7,623,885 B2
APPLICATION NO. : 10/946905
DATED : November 24, 2009
INVENTOR(S) : Rami Vaittinen et al.

It is certified that error appears in the above-identified patent and that said Letters Patent is hereby corrected as shown below:

Column 19, Claim 1, line 46: "$P_{CH=\min(\Gamma 0}-\Gamma_{CH}-a*(C+48), PMAX)$" should be --$P_{CH}=\min(\Gamma_0-\Gamma_{CH}-a*(C+48), PMAX)$--.

Column 20, Claim 8, line 23 and 24: "$P_{CH=\min(\Gamma 0}-\Gamma_{CH}-a*(C+48), PMAX$" should be --$P_{CH}=\min(\Gamma_0-\Gamma_{CH}-a*(C+48), PMAX)$--.

Column 21, Claim 16, line 16: "farther" should be --further--.

Column 22, Claim 24, line 20: "$P_{CH}=\min(\Gamma_0-\Gamma_{CH}-a*(C+48), PMAX)$" should be --$P=\min(\Gamma_0-\Gamma_{CH}-a*(C+48), PMAX)$--.

Column 24, Claim 28, line 13: "rower" should be --power--.

Signed and Sealed this

Thirteenth Day of July, 2010

David J. Kappos
*Director of the United States Patent and Trademark Office*